No. 718,479. PATENTED JAN. 13, 1903.
F. C. KECK.
INCUBATOR.
APPLICATION FILED OCT. 17, 1901.
NO MODEL.
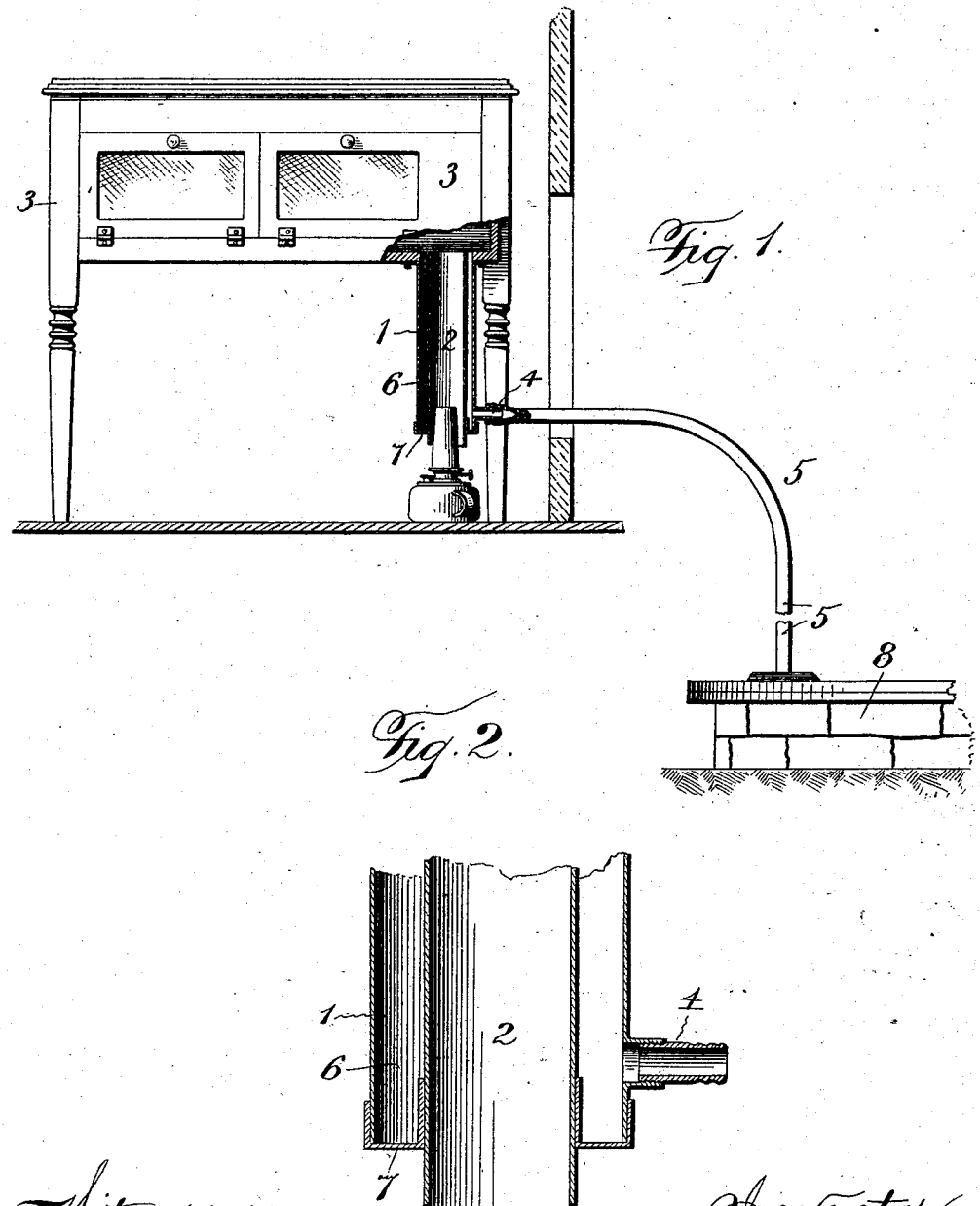

UNITED STATES PATENT OFFICE.

FREDERICK C. KECK, OF JOY, ILLINOIS.

INCUBATOR.

SPECIFICATION forming part of Letters Patent No. 718,479, dated January 13, 1903.

Application filed October 17, 1901. Serial No. 79,046. (No model.)

*To all whom it may concern:*

Be it known that I, FREDERICK C. KECK, a citizen of the United States, residing at Joy, in the county of Mercer and State of Illinois, have invented a new and useful Improvement in Incubators; and I do hereby declare the following to be a full, clear, and exact description of the invention, such as will enable others skilled in the art to which it appertains to make and use the same.

The invention relates to improvements in incubators; and it has for its object to provide simple and efficient means for supplying moist air to incubators without the employment of pans of water or similar means arranged within or adjacent to the egg-compartment, whereby the air within the incubator is prevented from becoming too heavily laden and overcharged with moisture, thereby preventing sweating of the eggs and the bad effects resulting therefrom.

The invention consists in the novel construction and arrangement of parts hereinafter described and shown, and particularly pointed out in the claims hereto appended.

In the drawings forming part of this specification, and in which like numerals of reference designate corresponding parts, Figure 1 is a vertical sectional view, partly in elevation, of an incubator constructed in accordance with this invention. Fig. 2 is a detail sectional view illustrating the construction of the sleeve to which the pipe or conduit is connected.

Referring to the drawings, 1 designates a sleeve surrounding a hot-air flue 2 of an incubator 3 and provided at one side with a nipple 4, to which is connected a hose 5. The sleeve which surrounds and is spaced from the hot-air flue 2 to provide an intervening annular passage 6 is closed at its lower end by an annular flange 7, L-shaped in cross-section and secured to the hot-air flue 2, as clearly shown in Fig. 2 of the drawings. The incubator may be of any desired construction, and the hot-air flue is designed to receive the chimney of a lamp or any other suitable form of heater.

The incubator is designed to be arranged in a room or apartment above the ground and containing dry warm air, and the pipe or conduit 5, which preferably consists of rubber hose, extends outward and downward from the incubator to a well or cistern 8, which is of sufficient depth to contain live oxidized air which is laden with moisture, and the air within the intervening space or passage between the flue and the outer sleeve or casing 1 becomes heated and ascends into the incubator, thereby causing a circulation of moist air through the pipe or conduit. By this means the incubator is supplied with moist air sufficient for the purposes of incubation, and the air within the incubator is thereby prevented from becoming overcharged with moisture, as is the case when the warm air in the incubator on entering the incubator is permitted to come directly in contact with a body of water, as is the case where water-pans or similar receptacles are employed. By these means the eggs are prevented from sweating and the incubation is not retarded and interfered with, as is the case when the eggs become damp by deposits of moisture on them.

The pipe or conduit may be connected with the incubator and with a well or cistern in any other desired manner, and I desire it to be understood that these and similar changes may be made without departing from the spirit or sacrificing any advantages of the invention.

What I claim is—

1. In a device of the class described, the combination of an incubator, a heater, a source of supply of cold moist air provided with a body of water arranged at a point sufficiently remote from the heater to prevent the water from being heated by the same whereby the supply of cold moist air to the incubator will be continuous, and a pipe or conduit extending from the source of supply and discharging into the incubator adjacent to the heater, substantially as described.

2. In a device of the class described, the combination with an incubator, and a source of supply of moist air arranged at a point remote from the incubator, of a hot-air flue communicating with the incubator, a sleeve or casing surrounding the flue and closed at the bottom and communicating at the top with the interior of the incubator, and a pipe or conduit extending from the sleeve or casing to the source of supply of moist air, substantially as described.

In testimony whereof I have signed my name to this specification in presence of two subscribing witnesses.

FREDERICK C. KECK.

Witnesses:
PAUL BUSTARD,
JACOB G. STALEY.